July 16, 1968  J. S. ECKERT  3,392,966
TREATING TOWER INDUCTOR
Filed July 28, 1966  2 Sheets-Sheet 1
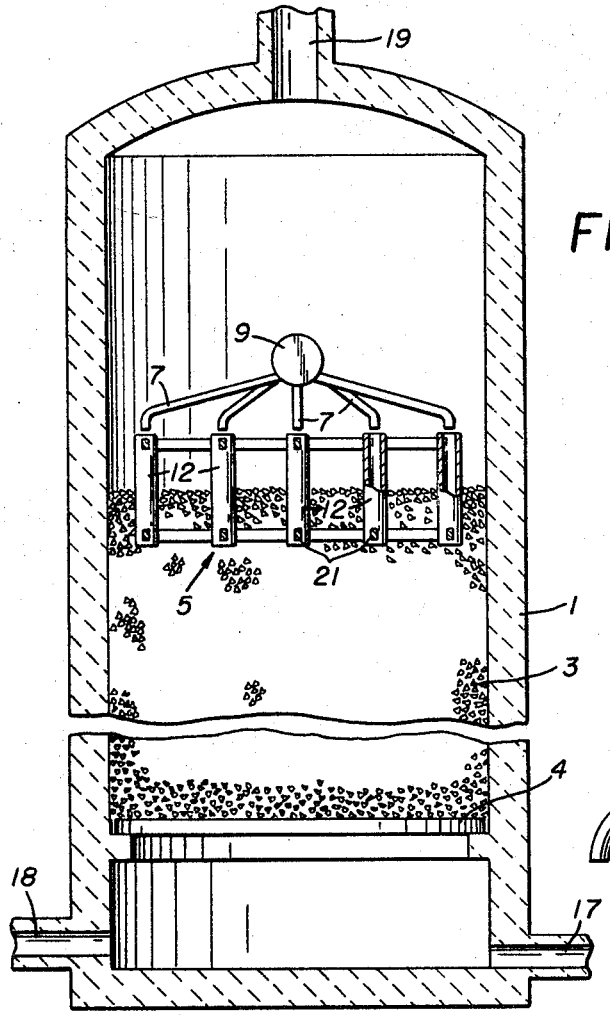
FIG. 1
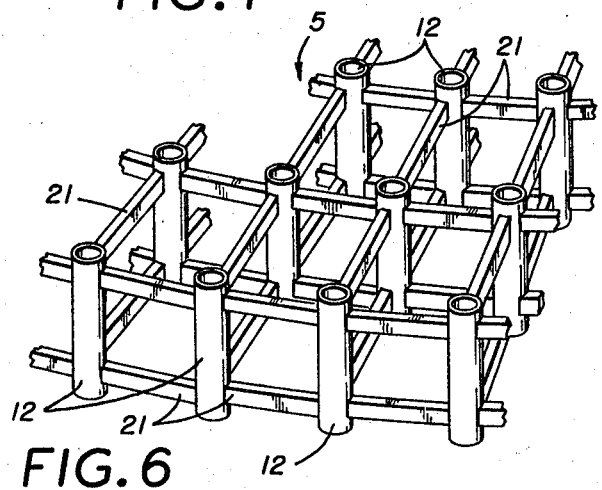
FIG. 6
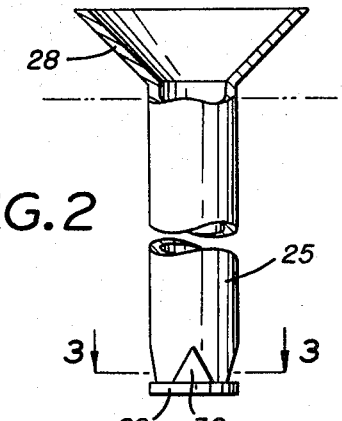
FIG. 2
FIG. 3
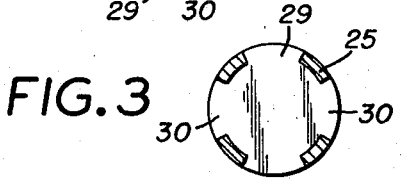
FIG. 4
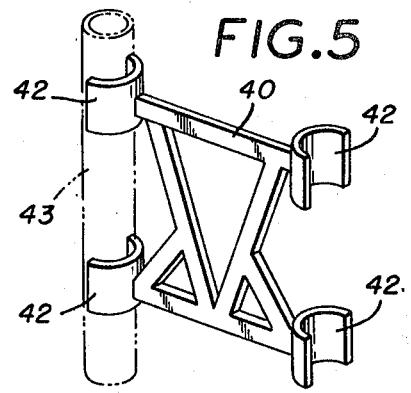
FIG. 5
INVENTOR.
JOHN S. ECKERT
BY
ATTORNEY July 16, 1968   J. S. ECKERT   3,392,966
TREATING TOWER INDUCTOR
Filed July 28, 1966   2 Sheets-Sheet 2

INVENTOR.
JOHN S. ECKERT
BY
ATTORNEY

# United States Patent Office 3,392,966
Patented July 16, 1968

3,392,966
TREATING TOWER INDUCTOR
John S. Eckert, Silver Lake, Ohio, assignor, by mesne assignments, to U.S. Stoneware, Inc., a corporation of Massachusetts
Filed July 28, 1966, Ser. No. 573,151
5 Claims. (Cl. 261—97)

ABSTRACT OF THE DISCLOSURE

A treating tower inductor for depositing liquid feed in the interior of a bed of packing elements, comprising an array of spaced pipe sections, held in fixed positions by an interconnecting grid formed of spacer elements.

---

This invention relates to a packed treating tower and refers more particularly to inductor means situated beneath any usual distributor means for introducing the liquid supplied by the distributor underneath the top of the uppermost bed of packing elements within the tower, or any other bed of packing elements within the tower. The purpose is to prevent particles of the liquid from being entrained in the gas which flows out of the tower. The invention includes the apparatus and the method of operating it.

When a liquid strikes the surface of a packed bed, splashing occurs which generates particles sufficiently small to be carried in the gas stream as entrained liquid, often with objectionable after-effects. Devices called "entrainment separators" have been used for removing these entrained droplets from the gas. Though this is a somewhat successful solution to this problem, it is not entirely satisfactory, particularly where the tower is operating near capacity and overloading of these "sperators" occurs.

According to this invention, the liquid is introduced into the bed at a point several inches below the surface of the bed, and the means for doing this is referred to herein as an inductor. With such a device, the splash liquid is confined to such short paths that it is caputred by the surfaces of the packing element adjacent to the point where the liquid is injected into the bed, and substantially all of the mist particles are separated from the gas stream.

Although the inductor is intended primarily for use in the uppermost bed in a packed tower, it may be used with any of the beds and particularly in a bed above which at least some gas is removed from the tower.

Different inductors have been designed for carrying out the invention. They provide means extending above the bed of packing elements which collect the liquid and distribute it in a relatively uniform manner across the whole cross section of the bed under its top surface. Usually the liquid is collected from a distributor (which may be of any usual design), but the inductor means may be connected directly with the distributor, if preferred. Openings in the inductor, located below the surface of the bed through which the liquid is introduced into the bed, may be greater in number than the openings above the bed which receive the liquid, so that there may be additional distribution of the liquid by the inductor means.

The inductor means may comprise metal tubes prelocated in a metal grid which is placed on the surface of the partially completed packed bed, and then the last several inches, for example six inches or one foot of the packing is added, thus leaving the upper ends of the tubes projecting above the bed with their bottoms ends extending into the bed. Their relative positions are maintained by a grid in such a way that the tubes do not shift. Such inductor is intended primarily for use with a bed of metal packing elements.

Ceramic inductor means may be used, and in this case it is difficult to connect the various tubes of the inductor by a grid or the like. Plastic means may be used which may be permanent (e.g. a tetrafluoride plastic such as Telflon), or may be dissolved by the liquid treated in the tower. Because of the possibility of shifting, the tops of such tubes are advantageously funnel shaped. Ceramic inductors will be most often used with beds of ceramic packing elements.

The invention is further described in connection with the accompanying drawings, in which:

FIGURE 1 is a section through a treating tower provided with a distributor, packed bed and inductor;

FIGURE 2 is an elevation of a tube to be used in an inductor;

FIGURE 3 is a section on line 3—3 of FIGURE 2;

FIGURE 4 is an elevation of the bottom only, of a different type of inductor tube;

FIGURE 5 is an elevation of part of an inductor, showing a tube and spacer;

FIGURE 6 is an isometric view of the inductor shown in FIGURE 1;

Figure 7:
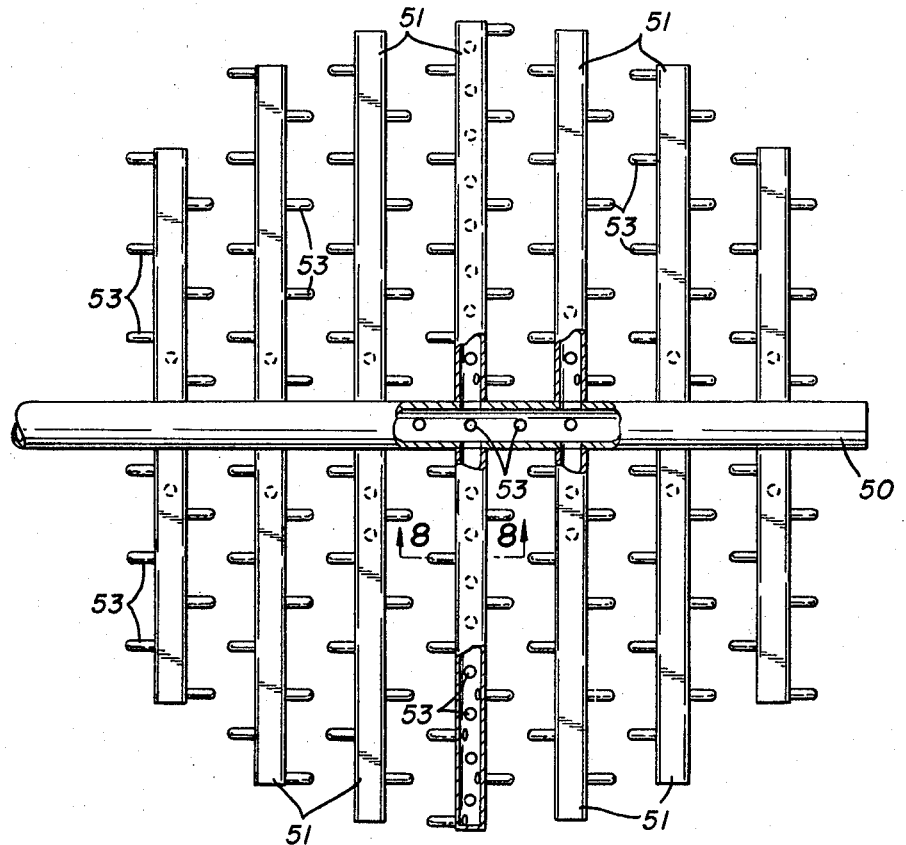
FIGURE 7 is a plan view (partly broken away) of a combined distributor and inductor.

The tower 1 of FIGURE 1 is intended to exemplify a tower of any suitable composition and design. The bed of packing elements 3 rests on the support plate 4. The bottom of inductor 5 is buried in the top few inches of the bed. Liquid from the delivery points 7 of the distributor 9 is fed into the tops of the pipes 12 of the inductor. The liquid enters the distributor through a feed line (not shown) and is drained off through outlet 17. Gas enters at 18 and leaves at 19.

The inductor of FIGURES 1 and 6 is advantageously used in a bed of metal packing elements and in that case is advantageously composed of the same metal as the packing elements. The pipes 12 through which the liquid flows into the bed are connected by the metal grid 21 which maintains the spacing of the pipes even though the bed may shift somewhat. In assembling the tower, the inductor is placed on the bed before all of the packing elements have been supplied to it, and then additional packing elements are supplied to bring the bed to the desired height. Any small packing elements, measuring from a fraction of an inch to several inches across may be used, and they are arranged randomly in the bed. The liquid is supplied from the distributor into the tubes 12, and flows from their bottoms into the bed at a level below its surface. Any spray particles which splash from the streams of liquid as they contact the packing elements, are separated from the gas stream by the packing elements located above the bottoms of the tubes.

The tubes 25 and 26 of FIGURES 2 and 3 are intended to be made of a ceramic composition and are intended for use with ceramic packing elements, but may be used with metal elements and may be made of metal, plastic, etc. Since these tubes are individual elements, and ordinarily are not connected with a rigid grid or the like, they may shift as the elements in the bed shift, and funnel tops 28 are provided so that they will still collect liquid from the distributor, even though their position is shifted.

The tube 25 is closed at the bottom by a plate 29, and the bottom edge of the tube is provided with openings 30 to redistribute liquid delivered from them.

The tube 26 is closed at the bottom by plate 32, and small tubes 33 redistribute the liquid that flows through the tube. The tubes 33 open downward, but this is not necessary as tubes opening outward horizontally are efficient.

It is desirable to provide spacers to space individual tubes such as the tube 25 or 26 while packing elements are filled in around them. Such spacers may be permanent or temporary. FIGURE 5 shows one type of spacer 40 that may be used. It may be of ceramic composition or it may be plastic. It may be a permanent plastic or one that dissolves in the liquid that is to be used in the tower. The central braced portion of the spacer is provided at its outer end with abutments 42 which fit against tubes 43, of any suitable construction. Abutments which are half cylinders are used where two abutments press against a pipe from opposite directions. If more than two abutments are used, each may be less than half a cylinder. The abutments may form any part of a cylinder up to 180°. Or several abutments, each measuring a full 180°, may be used pressing against a single pipe at different levels. The spacers may be united to the tubes by adhesive or the like.

Figure 8:
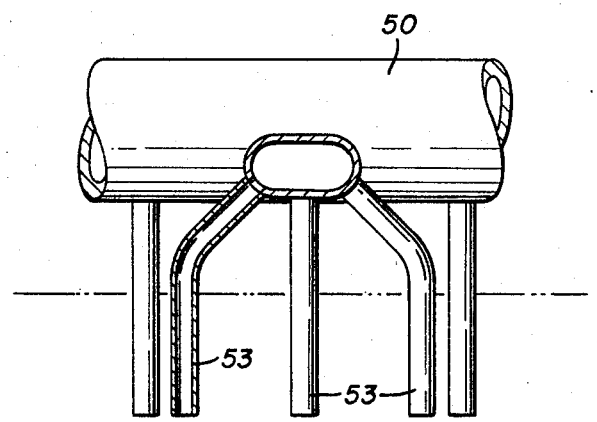
FIGURE 8 is a section on the line 8—8 of FIGURE 7.

The inductor may be fabricated as a part of a distributor, as illustrated in FIGURES 7 and 8. The liquid will enter the header 50 and flow out through branches 51. Each branch is provided with downwardly directed outlet tubes 53. The header and branches are located over the top of the packing bed and the bottoms of the tubes 53 are buried in the packing bed to a depth of several inches so that liquid enters the bed below its top surface.

The invention is covered in the claims which follow.

I claim:

1. A treating tower inductor dimensioned to occupy substantially the entire cross sectional area of a treating tower, comprising a substantially uniformly distributed array of spaced, axially aligned pipes, each having fluid inlet means and fluid outlet means, said pipes being interconnected into a self-supporting structure by an open grid formed of spacer elements disposed in a plane generally perpendicular to said axially aligned pipes, said pipes forming grid intersection points for said spacer elements.

2. The inductor of claim 1 in which each spacer element is separate from the pipes and is provided at each end with a cylindrical abutment of no more than 180° to fit against a pipe.

3. In combination with a treating tower having a liquid inlet and a gas outlet adjacent the top thereof; a liquid outlet and a gas inlet adjacent the bottom thereof; and a bed of packing elements positioned in said tower, the improvement comprising: an inductor comprising a substantially uniformly distributed array of spaced conduit means interconnected into a self-supporting structure by an open grid formed of spacer elements, said inductor being freely supported by said bed of packing elements and a portion of each of said pipes being submerged within said bed of packing elements.

4. The tower of claim 3 which is intended for use with a certain chemical and in which the spacing means is of plastic destructible by the chemical.

5. The treating tower as defined in claim 3 further including distributor means communicating with said liquid inlet, and having a plurality of openings communicating with the spaced pipes of said inductor.

References Cited

UNITED STATES PATENTS

| | | | |
|---|---|---|---|
| 218,445 | 8/1879 | Llewellyn | 261—98 X |
| 1,562,009 | 1/1925 | Straus | 261—97 |
| 1,790,224 | 1/1931 | Campbell | 55—258 X |
| 2,125,343 | 8/1938 | Hochschwender et al. | 261—97 |
| 2,197,935 | 4/1940 | Koolman | 261—97 |
| 2,231,828 | 2/1941 | Kerr | 261—96 |
| 2,609,888 | 9/1952 | Beringer | 55—233 |
| 2,819,887 | 1/1958 | Eversole et al. | 261—94 |
| 3,208,833 | 9/1965 | Carson | 261—96 X |
| 3,259,380 | 7/1966 | Brown | 261—97 |
| 912,881 | 2/1909 | O'Neil | 239—450 |
| 3,279,976 | 10/1966 | Eagle et al. | 239—450 X |

FOREIGN PATENTS

| | | |
|---|---|---|
| 411,277 | 10/1924 | Germany. |
| 22,050 | of 1904 | Great Britain. |
| 356,516 | 9/1931 | Great Britain. |
| 700,747 | 12/1953 | Great Britain. |
| 916,442 | 6/1964 | Great Britain. |
| 421,001 | 11/1925 | Germany. |

OTHER REFERENCES

Still, German Printed Application No. 1,052,621, 3/59, 261/98.

Schwanitz, German Printed Application No. 1,113,680, 9/61, 261–97.

HARRY B. THORNTON, *Primary Examiner.*

TIM R. MILES, *Assistant Examiner.*